US00RE34576E

United States Patent [19]

Camilleri

[11] E Patent Number: Re. 34,576

[45] Reissued Date of Patent: Apr. 5, 1994

[54] CASTING OF STRUCTURAL WALLS

[75] Inventor: Paul Camilleri, Bellevue Park, Australia

[73] Assignee: S.W.R. (Australia) Pty., Limited, Nerang, Australia

[21] Appl. No.: 794,362

[22] PCT Filed: Mar. 12, 1985

[86] PCT No.: PCT/AU85/00050

§ 371 Date: Nov. 12, 1985

§ 102(e) Date: Nov. 12, 1985

[87] PCT Pub. No.: WO85/04210

PCT Pub. Date: Sep. 26, 1985

Related U.S. Patent Documents

Reissue of:

[64] Patent No.: 4,681,483
Issued: Jul. 21, 1987
Appl. No.: 802,009
Filed: Nov. 12, 1985

U.S. Applications:

[63] Continuation of Ser. No. 381,900, Jul. 19, 1989, abandoned.

[30] Foreign Application Priority Data

Mar. 13, 1984 [AU] Australia ..... PG4019

[51] Int. Cl.[5] ..... E02D 5/20

[52] U.S. Cl. ..... 405/267; 405/258; 405/303; 405/269

[58] Field of Search ..... 405/267, 258, 303, 266, 405/269; 173/42, 91, 43, 96, 94, 99; 37/80 R, 80 A, 83-90, 191 R, 191 A, 192 R, 192 A, 94, 97

[56] References Cited

U.S. PATENT DOCUMENTS

| | | | |
|---|---|---|---|
| 867,536 | 10/1907 | Rochford et al. | 405/249 X |
| 1,164,072 | 12/1915 | Crall . | |
| 1,301,344 | 4/1919 | Wehner | 37/94 |
| 1,329,523 | 2/1920 | Hanson . | |
| 1,343,081 | 6/1920 | Hammen | 405/283 X |
| 1,723,691 | 8/1929 | Farrab . | |

(List continued on next page.)

FOREIGN PATENT DOCUMENTS

| | | | |
|---|---|---|---|
| 0032517 | 2/1973 | Australia . | |
| 676448 | 12/1963 | Canada | 37/80 R |
| 2063655 | 7/1971 | Fed. Rep. of Germany . | |
| 2143018 | 3/1973 | Fed. Rep. of Germany . | |
| 1223617 | 6/1960 | France . | |
| 1458165 | 10/1966 | France | 405/267 |
| 0153021 | 11/1981 | Japan | 37/83 |
| 0184129 | 11/1982 | Japan | 405/232 |
| 401778 | 10/1973 | U.S.S.R. . | |
| 0641046 | 1/1979 | U.S.S.R. | 37/89 |
| 975923 | 11/1982 | U.S.S.R. . | |
| 1361250 | 12/1987 | U.S.S.R. | 405/283 |
| 597749 | 3/1948 | United Kingdom | 37/86 |
| 1055484 | 1/1967 | United Kingdom | 405/267 |
| 1250046 | 10/1971 | United Kingdom . | |
| 1407590 | 9/1975 | United Kingdom . | |
| 2088930 | 6/1982 | United Kingdom . | |

*Primary Examiner*—Dennis L. Taylor
*Attorney, Agent, or Firm*—Nikaido, Marmelstein, Murray & Oram

[57] ABSTRACT

A machine (13) for the continuous casting of structural concrete walls (10) has a chassis (19) mounted on tracks (20). A telescopic boom (26) is mounted for buffing movement on a work platform (21) mounted for slewing movement relative to the chassis (19). A work head (30) has a work head unit (38) mounted for movement in three axes relative to the boom (26). The work head unit (38) has a continuous bucket excavator which digs a trench as the work head unit (38) is advanced and a continuous formwork (46) which supports the sides of the trench and defines the structural wall (10) which is cast as the work head unit (38) is advanced, pressurized concrete being supplied to the cavity defined by the formwork (46) by a pipe (14). Sensors on the work head (30) detect the beams from rotating laser and a fixed laser which defines the datum and line for the wall and the operation of the machine (13) is controlled by a computer which controls the orientation and advance of the work head unit (38) and the advance of the machine (13).

11 Claims, 3 Drawing Sheets

U.S. PATENT DOCUMENTS

| | | | |
|---|---|---|---|
| 2,048,710 | 7/1936 | Ranney . | |
| 2,052,372 | 8/1936 | Van Voorhis et al. | 37/83 |
| 2,526,176 | 10/1950 | Van Eyck | 405/233 |
| 2,772,491 | 12/1956 | Stansbury | 37/86 A |
| 2,797,503 | 7/1957 | Livingston | 37/80 R |
| 2,994,974 | 8/1961 | Domenighetti | 405/282 X |
| 3,209,472 | 10/1965 | Nickolaer et al. | 37/90 UX |
| 3,540,139 | 11/1970 | Gethmann et al. | 37/87 |
| 3,636,715 | 1/1972 | Morner . | |
| 3,646,767 | 3/1972 | Shelley . | |
| 3,727,332 | 4/1973 | Zimmer . | |
| 3,789,989 | 1/1974 | Heckathorn | 37/97 X |
| 3,813,171 | 5/1974 | Teach et al. | 37/80 R |
| 3,893,302 | 7/1975 | Peterson . | |
| 3,952,532 | 4/1976 | Spearman | 405/164 |
| 4,067,398 | 1/1978 | Franzen et al. | 193/43 |
| 4,126,083 | 11/1978 | Haak et al. | 173/43 X |
| 4,159,585 | 7/1979 | Bronn | 405/282 X |
| 4,197,032 | 4/1980 | Miller . | |
| 4,247,997 | 2/1981 | Paurat et al. | 37/82 |
| 4,298,293 | 11/1981 | Bancom . | |
| 4,364,540 | 12/1982 | Montabert | 173/43 X |
| 4,379,658 | 4/1983 | Schnedrecht | 37/80 R X |

CASTING OF STRUCTURAL WALLS

Matter enclosed in heavy brackets [ ] appears in the original patent but forms no part of this reissue specification; matter printed in italics indicates the additions made by reissue.

*This application is a continuation of application Ser. No. 07/381,900 filed Jul. 19, 1989, now abandoned.*

BACKGROUND OF THE INVENTION (1) Field of the Invention

This invention relates to a method of, and apparatus for, the continuous casting of structural concrete walls.

(2) Prior Art

The speed of completion and cost of foundation works is directly related to the techniques used. In the highly developed areas such as the Gold Coast region of Australia, the techniques are often governed by the proximity of existing buildings to the property line. In addition, the techniques must allow for the low structural strength of many types of soil.

In the Gold Coast region, for example, continuous piling techniques are employed but these are generally slow, have an unattractive appearance, are prone to water leakage and are generally costly.

Continuous casting of structural walls has been proposed e.g. see U.S. Pat. No. 2,526,176 (Van Eyck). However, the method disclosed in that patent is extremely laborious and the use of the tracks for the excavating and casting machines precludes the casting of a wall closely adjacent e.g. within 10 mm. of an existing wall.

SUMMARY OF THE PRESENT INVENTION

It is an object of the present invention to provide a method of, and apparatus for, the continuous casting of structural walls.

It is a preferred object to provide a method, where the foundation trenches are immediately filled with concrete pumped under pressure to stabilize the surrounding soil.

It is a further preferred object to provide a method which eliminates the need for the underpinning and shoring of existing foundation walls closely adjacent a property line.

It is a still further preferred object to provide a method which requires little site preparation and yet enables the resultant walls to be dimensionally accurate, straight and level.

Other preferred objects of the present invention will become apparent from the following description.

In one aspect the present invention resides in a method for the continuous casting of a structural concrete wall including the steps of:

excavating a trench;

temporarily supporting the sides of the trench with moving formwork immediately following the excavation;

pumping concrete under pressure into the formwork to fill the trench and stabilize the sides of the trench; and allowing the concrete to set to form the structural wall.

In a second aspect the present invention resides in apparatus for the continuous casting of a structural concrete wall including:

a work head mountable on a moving machine;

a continuous excavator on the work head adapted to dig a trench as the work head is advanced;

Formwork means immediately behind the excavation to support the sides of the trench as the work head is advanced; and means to supply concrete under pressure to the trench to fill the trench and stabilize the soil and form the wall.

The work head is preferably mounted on the distal end of a slewing, buffing and/or extendable boom mounted on a wheeled- or tracked vehicle chassis. Preferably the work head is mounted for movement in all three axes relative to the boom to enable its correct orientation to be maintained as the vehicle is advanced over uneven terrain.

Preferably the excavator comprises a bucket or other continuous excavator and the soil may be conveyed away from the trench by any suitable conveying means.

Preferably the formwork is of substantially U-shape in plan, the legs of the formwork engaging and supporting the sides of the trench, the base of the formwork providing a shield between the excavator and the concrete.

Preferably the formwork includes an adjustable plate which forms the top of the wall.

Suitable hoses or pipes may convey the concrete under pressure from a remote concrete pump to the formwork and one or more vibrators may be provided in the formwork to compact the concrete.

Preferably automatic guidance means are provided on the work head to control the latter. The guidance means may include sensors which detect the beam from one or more lasers which provide a datum and a computer to assess the sensor outputs and control the work head to correct any deviations caused by uneven terrain.

BRIEF DESCRIPTION OF THE DRAWINGS

To enable the invention to be fully understood, a preferred embodiment will now be described with reference to the accompanying drawings, in which.

DETAILED DESCRIPTION OF THE PREFERRED EMBODIMENTS

Figure 1:
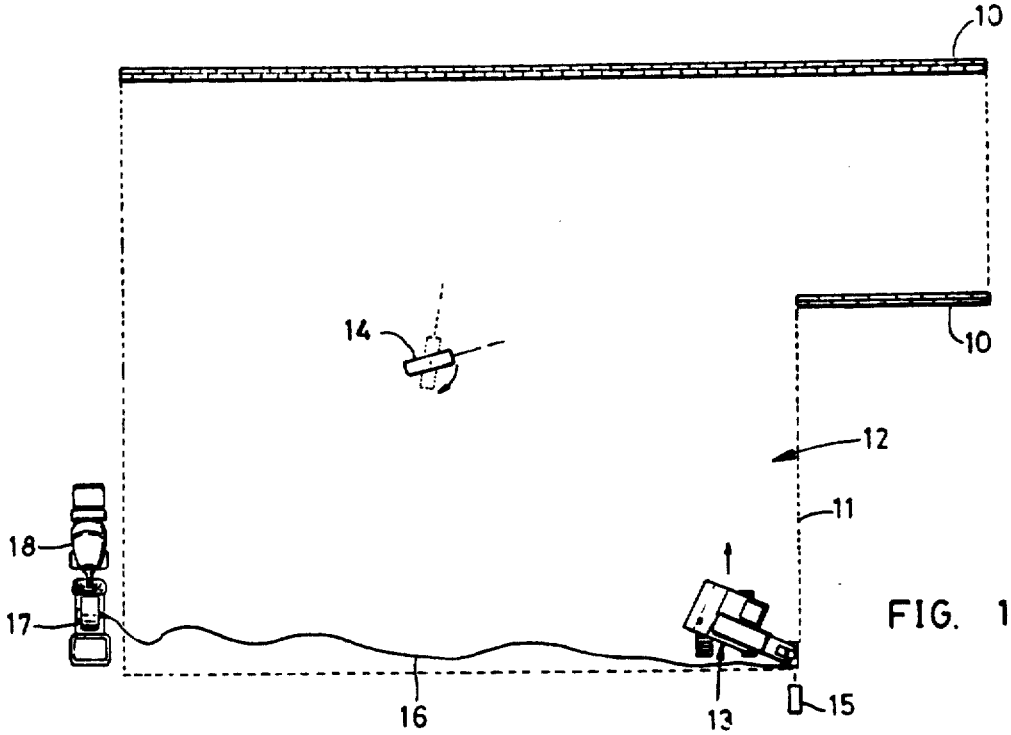
FIG. 1 is a schematic plan view showing a wall being erected on a building site.

Referring to FIG. 1, the invention is used to erect structural foundation walls 10 around the boundary 11 of a building site 12.

The excavating and casting machine 13 of the present invention is shown adjacent one corner of the building site in preparation to form a wall along the adjacent boundary line.

A rotating laser 14 adjacent the centre of the site establishes a datum level for the height of the walls 10 while a fixed laser 15 directs a beam along the boundary line 11 to establish a datumline for the straight-line accuracy of the wall.

Concrete under pressure is pumped to the machine 13 via a flexible hose 16 from a concrete pump 17 supplied by concrete mixers 18.

Figure 2:
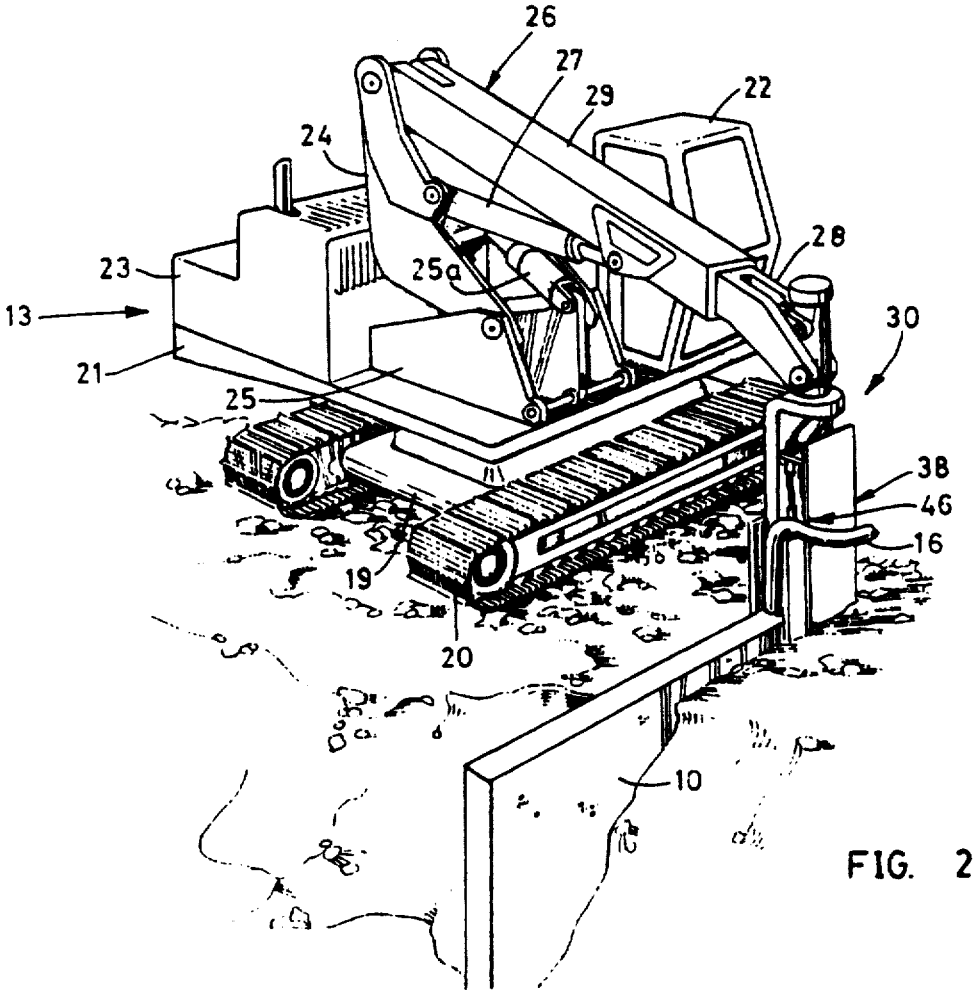
FIG. 2 is a schematic view of the wall being continuously cast.
Figure 3:
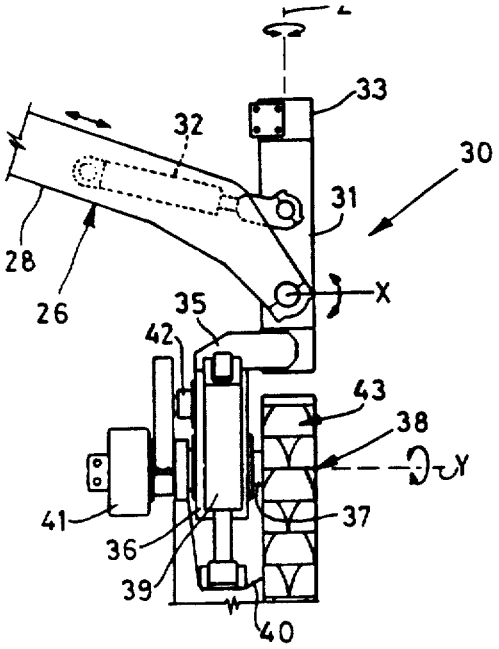
FIG. 3 is a rear view showing the mounting of the work head on the boom (parts being omitted for clarity)

Referring to FIGS. 2 and 3, the machine 13 has a chassis 19 mounted on tracks 20. A work platform 21 is slewably mounted on the chassis 19 and is provided with an operator's workstation 22 and a power unit 23.

A boom support member 24 is pivotally mounted on support brackets 25 on the platform 21 and is raised and lowered by a ram 25a.

A telescopic boom 26 is mounted for buffing movement at the upper end of the boom support member 24 and is raised and lowered by a ram 27. A ram (not shown) is provided to extend or retract the outer portion 28 of the boom relative to the inner portion 29.

The workhead assembly 30 has a housing 31 pivotally mounted at the distal end of the boom 26, the rotation of the housing about the X-axis relative to the boom being controlled by a ram 32. A hydraulic motor 33 on the housing 31 rotates the work head about the Z-axis.

A horizontal arm 35 extends inwardly from the lower end of the housing 31 and has a vertical leg forming a work head carrier 36. An axle 37 extends horizontally to the work head carrier and the work head unit 38 is supported at its upper end of the axle 37. A hydraulic ram 39 is connected to the carrier 36 and to a support plate 40 on the inner side of the work head unit to rotate the work head unit 38 about the Y-axis.

A hydraulic motor 41 drives a gearbox 42 on the carrier which is operatively connected to the continuous excavator 43 mounted on the work head unit 38.

Figure 4:
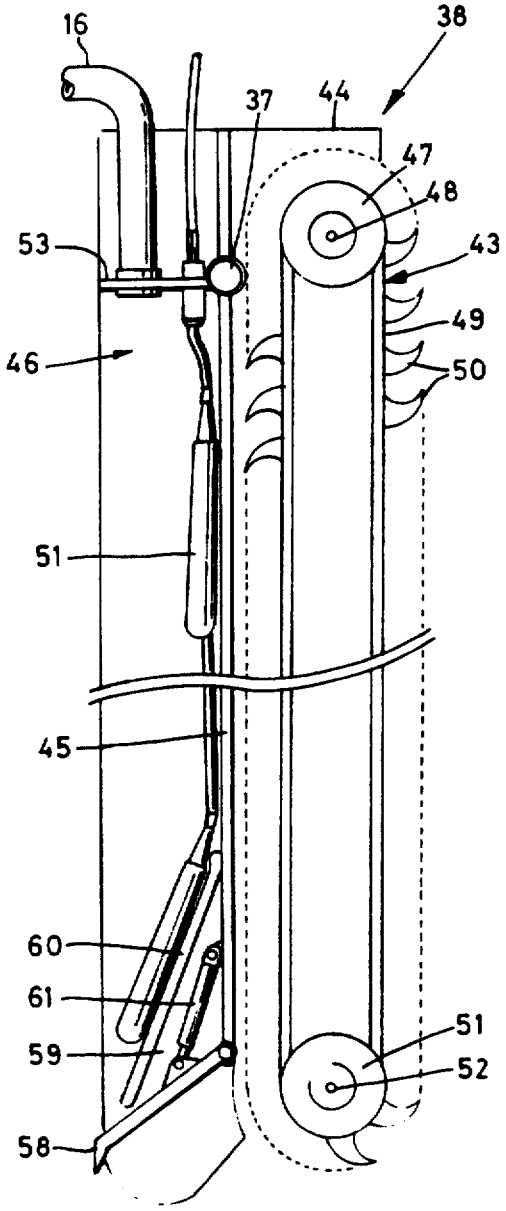
FIG. 4 is a sectional side view of the work head.

Referring now to FIG. 4, the work head unit 38 is of substantially H-shape in plan view with a pair of side plates 44 interconnected by a transverse dividing wall 45 which separates the excavator 43 from the formwork 46. The excavator 43 has a top driving sheave or pulley 47 fixed on a drive shaft 48 journalled in the side plates and driven by the gearbox 42. A pair of continuous side chains 49, carrying buckets or picks 50, pass around the driving sheave 47 and a bottom driven sheave 51 mounted on a shaft 52 journalled between the lower ends of the side plates 44. As the machine is advanced, the buckets 50 on the forward run of the excavator excavate the trench and dump the excavated soil to each side thereof.

The side plates 44 form the moving sides of the formwork 46 which has a vertically adjustable top plate 53 which defines the top face of the wall 10 as the work head advances. The flexible hose 16 has its output connected to the top plate 53 to enable the concrete to be pumped into the cavity fenced by the formwork.

A plurality of vibrating units 57 are provided down the formwork adjacent the dividing wall 45 to cause the concrete to be compacted as it is poured.

Figure 6:
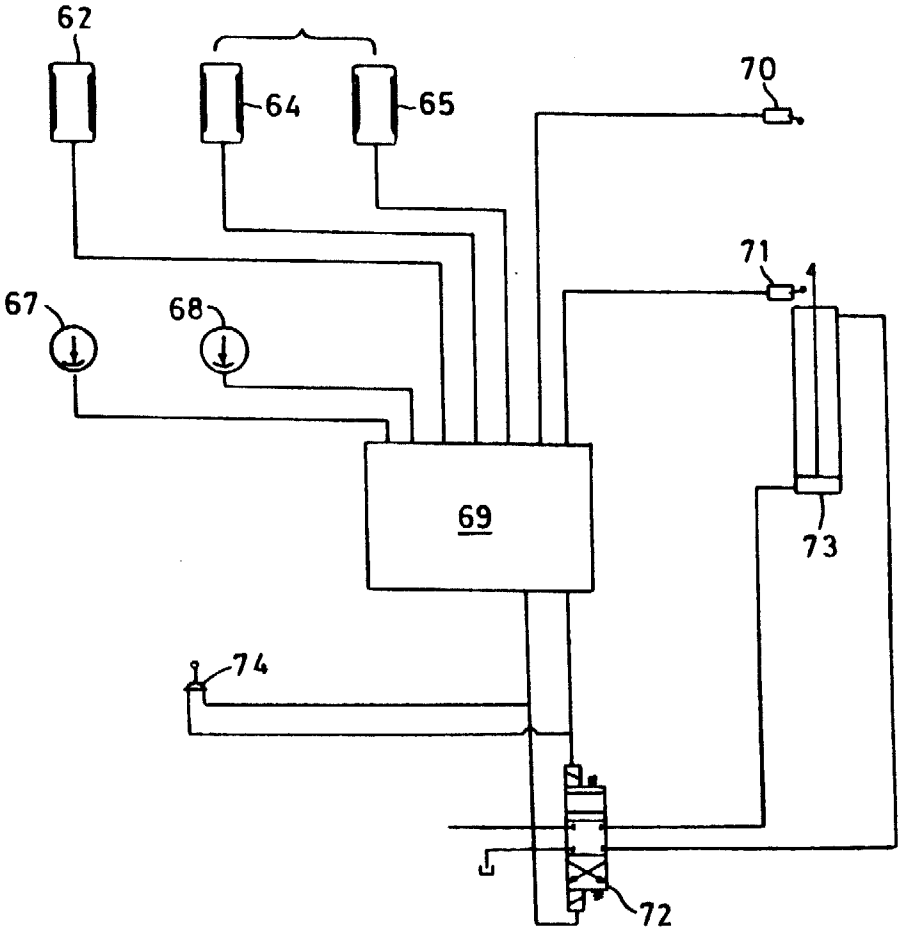
FIG. 6 is a schematic circuit diagram of the guidance system.
Figure 5:
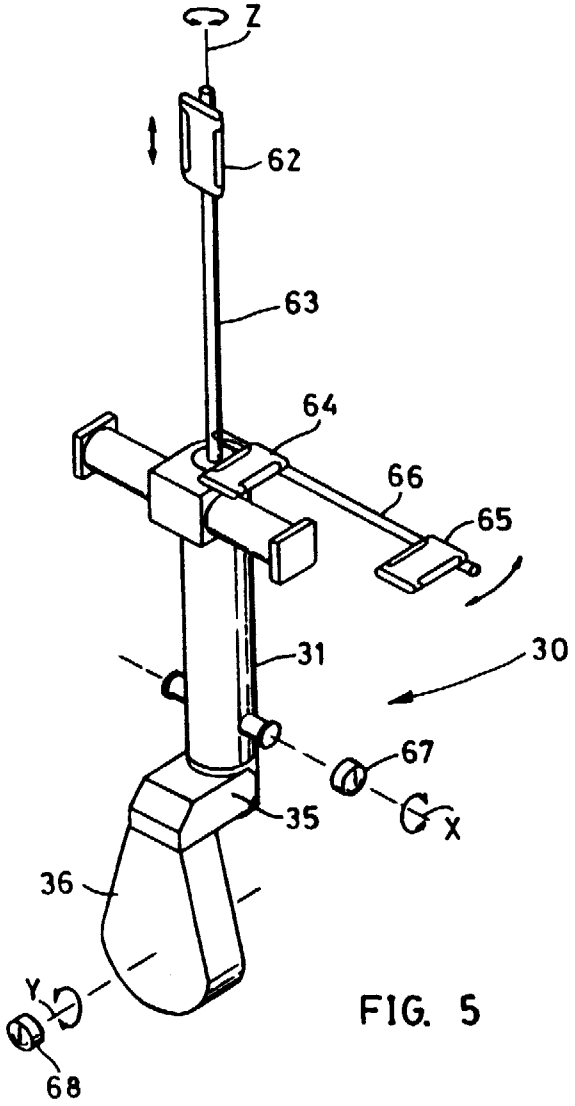
FIG. 5 is a schematic view of the guidance system for the work head.

To enable the work head unit 38 to open a trench, a pivotally mounted digging arm 58 is provided in a housing 59 at the base of the workhead unit behind the dividing wall 45 (and separated from the formwork by a wall 60). A hydraulic ram 61 is operable to cause the digging arm 58 to extend downwardly and forwardly from the workhead unit to enable the unit to be lowered to the desired depth at the commencement of the trench. The guidance system for the work head 30 will now be described with reference to FIGS. 1, 5 and 6.

As hereinbefore described, the rotating laser 14 establishes the datum level for the wall 10 and the beam from the rotating laser 14 is detected by a sensor 62 mounted on a staff 63 on the housing 31. The fixed laser 15 provides the linear datum for the machine on the work head 30 as it advances along the boundary 11 and the beam from the laser is detected by a pair of spaced sensors 64, 65 supported on a horizontal arm 66. Respective level sensors; 67, 68 on the housing 31 and carrier 36 monitor the orientation of the work head 30 relative to the X- and Y-axes respectively.

The outputs from the sensors 62, 64, 65, 67 and 68 are all fed to a microcomputer 69 (see FIG. 6) which processes the information and determines the actual position of the work head assembly 30 to the datums established by the lasers 14, 15. Limit switches 70, 71 monitor the extension of the boom 26 and the data is also fed to the computer which operates respective control valves e.g. valve 72 to retreat and extend ram 73 to extend or retract the boom 26 or rams 32, 39 or motor 33 to adjust and correct the orientation of the work head assembly 30. This control can be overridden by a manual joystick 74 fitted in the operator's workstation 22.

The operation of the machine will now be described.

The lasers 14, 15 are positioned on the building site 10 as shown in FIG. 1 to establish the datum levels and lines for the wall 10 to be erected.

The machine 13 is positioned adjacent the corner of the site when the wall is to be commenced, with the tracks 20 substantially parallel to the boundary line 11. The boom 26 is slewed and extended to position the work head assembly 30 on the corner of the site and the rams 32 and 39 are operated to position the work head assembly 30 vertical about both the X and Y axes, while the hydraulic motor 33 is operated to align the work head assembly with the boundary line.

The operator then operates the digging arm 58 (via ram 61) to cause the trench to be opened and the ram 27 (and ram 25a) is retracted to lower the boom 26 as the work head unit 38 enters the hole dug by the digging arm. Simultaneously, the computer 69 retracts the ram 73 to retract the boom 26 (to maintain the distance between the machine and the work head unit 38) and retracts the ram 32 to maintain the vertical orientation of the work head unit relative to the X-axis.

When the work head unit has reached the required depth, as detected by the sensor 62 detecting the beam from the rotating laser 14, the excavator 43 is put into operation and the work head unit is advanced. To maintain the correct orientation of the work head unit to the datum line established by the laser 15, the computer 69 must slew the boom, retract the boom 26 (by retracting the ram 73), and rotate the work head unit 38 by the motor 33. To maintain the orientation of the work head unit relative to the Y-axis, e.g. if the excavator strikes rock, the computer may have to retract or extend the arm 39 and/or halt the slewing of the boom until the obstruction is cleared. Any misalignment of the work head unit 38 to the datum line as it advances is detected by the sensors 64, 65 and the computer 69 operates the rams etc. to make the necessary corrections.

When the boom 26 has been slewed to a position at a normal to the boundary line, the machine 13 may be advanced and the computer operates to maintain the work head unit at the desired orientation as detected from the various sensors 62, 64, 65, 67 and 68.

Simultaneously with the advance of the work head unit 38 from the corner of the site, concrete is pumped under pressure through the flexible hose 14 and fills the cavity formed by the formwork 46. The side plates 44 and top plate 53 of the formwork 46 define the side face and top face of the wall 10, and the side plates 44 stabilize the side of the trench as the work head unit 38 is advanced. The concrete is compacted by the vibrating units 57 as the wall is cast and the resultant wall 10 has smooth side faces and top face.

When the machine reaches the end of the boundary line, and the excavator 43 is closely adjacent or in engagement with, the previously erected wall at the corner, the operator stops the excavator and raises the boom to lift the work head unit from the trench. Concrete can be pumped into the remaining cavity to complete the wall.

By making the machine fully computer controlled via microcomputer 69, and by use of the sensors 62, 64, 65, 67, 68 and the lasers 14, 15, the operator is only required to initially position the machine 13 and operate the digging arm 68 to open the trench and to stop the machine at the end of the boundary line. The operation of the machine throughout the excavation of the trench and the casting of the wall can be fully controlled by the computer 69 which is programmed to shut down the machine should the machine stray from the limits set by the lasers 14, 15 and not be able to take the necessary corrective action. Indeed, the operator may control the machine from a small hand-held transmitter e.g. of the type used to control garage doors, to switch the machine on and off once it has been initially positioned.

By monitoring the movement of the machine and the concrete flow to the work head, the computer can calculate the volume of concrete poured and if the total volume of the wall has been previously estimated, the volume of concrete required to complete the wall.

If required, rotary cutters (not shown) may be provided at the base of the work head unit 38 rearwardly of the excavator 43 to undercut the sides of the trench to form a divergent base on the wall 10.

As the work head assembly 30 is carried at the distal end of the boom 26, the machine can erect a wall closely adjacent (e.g. within 10 mm.) of an existing wall. In addition, as the formwork 46 supports the sides of the trench formed by the excavator 43 and the sides of the trench are then stabilized by the pressurized concrete, no underpinning or shoring of the existing wall is required.

The advantages of the present invention will be readily apparent to the skilled addressee.

Various changes and modifications may be made to the embodiments described without departing from the scope of the present invention defined in the appended claims.

I claim:

1. A method for the continuous casting of a structural concrete wall including the steps of:

mounting a work head on the distal end of an extendible boom mounted on the chassis of a moving vehicle, said work head being mounted for [movement about] *rotation in* three axes relative to the boom,

*providing an excavator mounted on said work head,*

[excavating] *operating said excavator to commence* a trench [using an excavator mounted on said work head] *by digging substantially vertically downward to one side of the chassis,*

*further operating said excavator to excavate said trench,* temporarily supporting the sides of the trench with moving formwork immediately following the excavator, pumping concrete under pressure into the formwork to fill the trench and stabilize the sides of the trench, and allowing the concrete to set to form the structural wall.

2. Apparatus for the continuous casting of a structural concrete wall including:

a work head mountable on a movable vehicle;

a continuous excavator on said work head adapted to dig a trench as said work head is advanced;

formwork means on said work head immediately behind the excavator to support the sides of the trench as said work head is advanced; and means to supply concrete under pressure to the trench to fill the trench, stabilize the sides of the trench and form the wall; wherein said work head is mounted on the distal end of an extendable boom mounted for slewing and luffing movement on the chassis of the movable vehicle; said work head being mounted for movement in three axes relative to the boom includes:

a housing pivotally mounted on the boom for pivotal movement relative to the boom about one of the horizontal axes; and a separate work head pivotally mounted on the housing for pivotal movement relative to the housing about the second of the horizontal aces, said separate work head unit being further rotatable about a vertical axis relative to the housing.

3. Apparatus as claimed in claim 2 wherein:

the vehicle has a wheel- or track mounted chassis.

4. Apparatus as claimed in claim 3 wherein:

sensor means are provided to monitor the orientation of said work head to the two horizontal axes of movement.

5. Apparatus as claimed in claim 2 wherein:

the excavator includes a continuous bucket excavator mounted vertically on the forward end of said separate work head unit, the excavator being adapted to excavate a trench as said separate work head unit is advanced.

6. Apparatus as claimed in claim 5 and further including:

a reciprocating digger arm at the base of said separate work head unit adapted to dig a hole to enable said separate work head unit to be lowered into the soil at the commencement of the trench.

7. Apparatus as claimed in claim 2 wherein:

the formwork is of substantially U-shape in plan and open to the rear to enable the wall to be cast as said work head is advanced, the formwork having a pair of side plates interconnected by a dividing wall to separate the formwork from the excavator and, a top plate, the side plates supporting the sides of the trench and defining the side faces of the cast wall and the top plate defining the top face of the wall.

8. Apparatus as claimed in claim 7 wherein:

the means to supply the concrete under pressure includes a flexible hose connected to a concrete pump and having its outlet with the cavity defined by the formwork.

9. Apparatus as claimed in claim 8 and further including:

at least one vibrator unit within the cavity defined by the formwork to compact the concrete as it is being cast.

10. Apparatus as claimed in claim 4 wherein:

a rotating laser is provided to establish the datum level of the wall and a fixed laser is provided to establish the datum line of the wall;

the sensor means including sensors provided on said work head to detect the laser means generated by the rotating and fixed lasers; and a computer receives data from the sensors to determine said orientation of the work head relative to the datum level and line and is operable to cause movement of the boom and said separate work head unit to correct any deviation of the orientation of the work head from the datum level line.

11. Apparatus as claimed in claim 10 and further including:

sensors on the work head to monitor the orientation of said work head relative to the horizontal axis, said outputs from the sensors being fed to the computer for processing and control of the orientation of said work head.

* * * * *